Patented Apr. 22, 1930

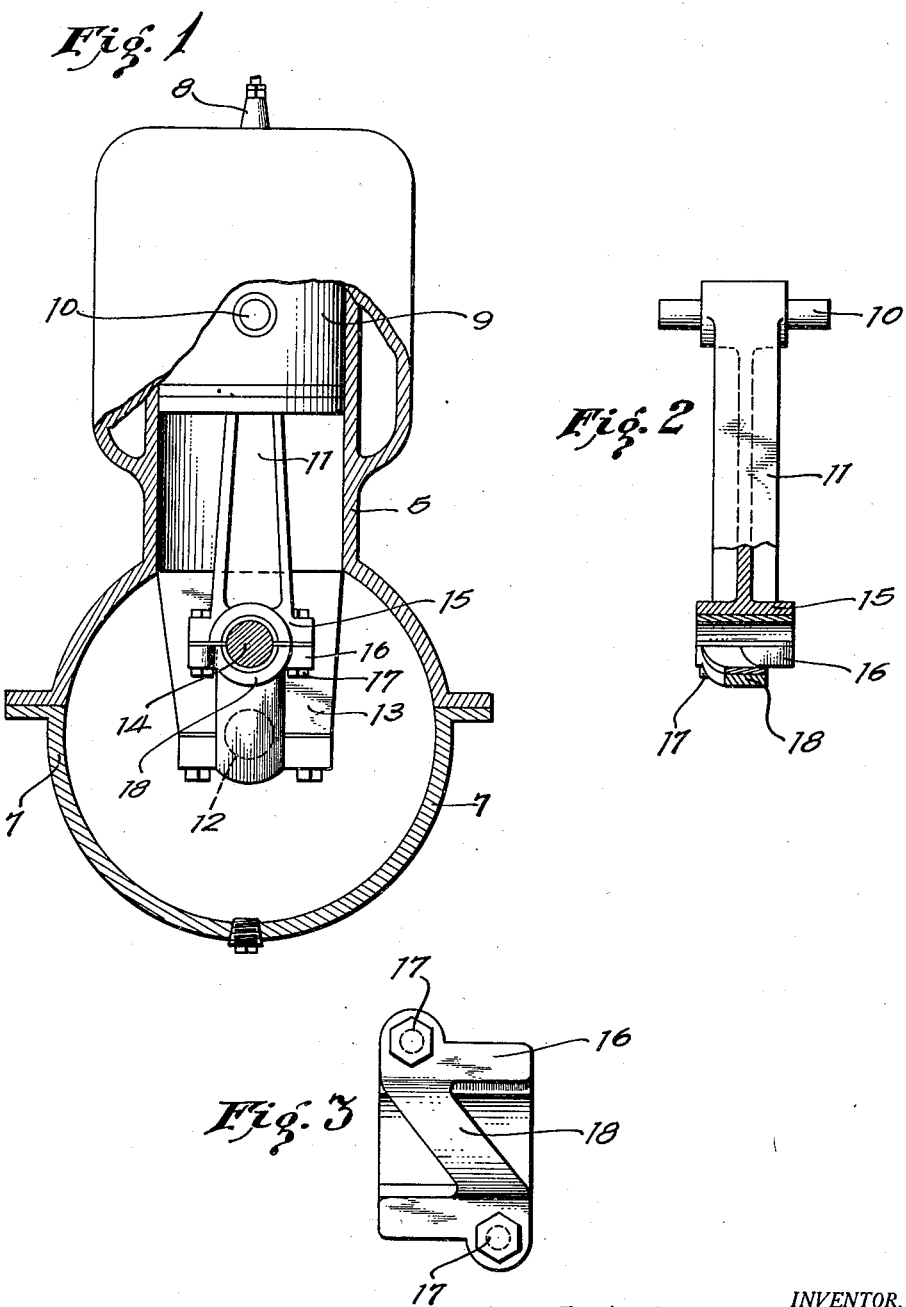

1,755,570

UNITED STATES PATENT OFFICE

FRED C. THOMSON, DECEASED, LATE OF BEVERLY HILLS, CALIFORNIA, BY DAVID R. FARIES, ADMINISTRATOR, OF LOS ANGELES, CALIFORNIA

BEARING BOX

Application filed January 28, 1929. Serial No. 335,668.

This invention relates to a bearing box especially adapted for crank shafts and connecting rods of internal combustion engines, although not limited to such use. In internal combustion engines of the single acting type, transmission of power only occurs on the out or working stroke. For this reason, the connecting rod bearing box coacting with the crank pin requires a large bearing surface on the near connecting rod side. The area of the bearing surface on the far connecting rod side is not required to be as large. In upright engines employing a splash system for oiling the crank shaft, it has been proposed to cut away a portion of the lower half of the bearing box so as to expose the crank pin and provide a larger accessible surface for the oil to splash against, the rotation of the pin carrying the oil to the bearing surface of the upper half. In such constructions, a strip of bearing surface forming a part of the box has been located normal to and circumferential of the crank pin on the lower half of the box. However, this results in a zone to which oil is not directly supplied and the lubrication is therefore not uniform. It is an object of this invention to provide a cut-away bearing box having a strip of bearing surface so located that the crank pin bearing surface is exposed over its entire axial extent. A more specific feature of this invention is the provision of a bearing box having a portion comprising a strip which is pitched with respect to the axis of the bearing so that substantially the entire axial extent of the bearing is open and exposed during a complete revolution.

These objects together with other objects and corresponding accomplishments are obtained by means of the embodiments of my invention illustrated in the accompanying drawings, in which:—

Fig. 1 is a side elevation partly in vertical section of a single cylinder and crank case of a conventional type and having a bearing box embodying the invention; Fig. 2 is a side elevation of the connecting rod partly in section with the box in section; and Fig. 3 is a bottom plan view on an enlarged scale of the box.

Referring more particularly to the drawings, 5 indicates an engine cylinder of the water cooled type having a water jacket section. The engine is of the upright type having a crank case 7 and is single acting. It may be a two stroke gas engine of a conventional type. 8 marks a spark plug. A reciprocating piston is indicated by 9 and has attached thereto by a wrist pin 10 a connecting rod 11. A crank shaft extends across the crank case and is mounted in suitable bearings 13. The crank pin marked 14 is secured to the connecting rod 11 by a bearing box embodying my invention. The engine shown is intended to be lubricated by the crank shaft splashing the oil contained in crank case 7 in a well known manner.

If the bearing box comprises a collar completely enveloping the crank pin, oil can only reach the bearing surfaces by travelling inwardly from the ends of the box. The working stroke of the engine causes a downward pressure upon the crank, while on the return stroke intake and scavenging occurs. In the case of a two stroke gas engine, intake, scavenging and compression take place on the in stroke, and in the case of a four stroke engine, exhaust takes place upon one in stroke, and compression upon another. However, the force exerted upon the bearing during the in strokes does not require as large a bearing surface. It is therefore possible to expose the lower half of the bearing without decreasing the strength of the box beyond that necessary for good design. In the present construction, the connecting rod is formed with one half of the bearing box comprising a semi-collar 15. The lower half of the bearing box indicated by 16 has flanges for securing the bearing box sections together by means of bolts 17. Instead of a lower semi-collar there is a strip 18 pitched with relation to the axis of the crank and of such width that the entire axial bearing extent of the shaft will be exposed during one revolution. This enables oil to be applied to the crank pin over its entire bearing surface and to be carried around to the upper half of the bearing box. Thus, uniform lubrication is obtained.

What is claimed is:—

1. The combination of a splash lubricated shaft, a split bearing box for said shaft comprising two sections, one section being semi-cylindrical and the other comprising a strip extending from one end of said box to the other and of a width such as to expose the shaft for axial extent of its coacting bearing surface.

2. The combination of a splash lubricated shaft, a bearing box therefor, a lubricant chamber housing said shaft and box, said box having one half thereof formed by a strip pitched in relation to the axis of said box and of a width such as to expose the shaft for the width of said box.

3. The combination of a splash lubricated shaft, a bearing box therefor, a lubricant chamber housing said shaft and box, said bearing box being split and comprising two sections, one section being semi-cylindrical and the other comprising a strip pitched in relation to the axis of said box and of a width such as to expose the shaft for the width of said box.

4. In an upright internal combustion engine, the combination of a splash lubricated shaft, a bearing box therefor, a lubricant crank case housing said shaft and box, said bearing box having the lower half formed by a strip pitched in relation to the axis of said box and the width such as to expose the shaft for the width of said box.

5. In an upright internal combustion engine, the combination of a crank, a connecting rod having a bearing box for said crank, a crank case housing said crank and bearing box, said bearing box being split and comprising two sections, the upper section being semi-cylindrical and the lower section comprising a strip pitched in relation to the axis of said box and of a width such as to expose the shaft for the width of said box.

In witness whereof I have hereunto subscribed my name this 9th day of January, 1929.

DAVID R. FARIES,
*Special Administrator of Fred C. Thomson, Deceased.*